(12) United States Patent
Grove et al.

(10) Patent No.: US 10,163,061 B2
(45) Date of Patent: Dec. 25, 2018

(54) QUALITY-DIRECTED ADAPTIVE ANALYTIC RETRAINING

(71) Applicant: International Business Machines Corporation, Armonk, NY (US)

(72) Inventors: David P. Grove, Ridgefield, CT (US); Martin J. Hirzel, Ossining, NY (US); Wei Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 14/743,071

(22) Filed: Jun. 18, 2015

(65) Prior Publication Data
US 2016/0371601 A1 Dec. 22, 2016

(51) Int. Cl.
G06N 99/00 (2010.01)

(52) U.S. Cl.
CPC ................. G06N 99/005 (2013.01)

(58) Field of Classification Search
None
See application file for complete search history.

(56) References Cited

U.S. PATENT DOCUMENTS

| | | | |
|---|---|---|---|
| 8,103,530 B2 | 1/2012 | Quiring et al. | |
| 8,533,222 B2 | 9/2013 | Breckenridge et al. | |
| 8,682,819 B2 * | 3/2014 | Consul | H04L 51/12 706/20 |
| 8,762,298 B1 * | 6/2014 | Ranjan | G06N 5/02 706/12 |
| 9,183,499 B1 * | 11/2015 | Krivokon | G06F 17/30864 |
| 2003/0200189 A1 * | 10/2003 | Meng | G06N 3/082 706/26 |
| 2004/0249480 A1 * | 12/2004 | Lefebvre | G05B 7/02 700/31 |
| 2009/0319456 A1 * | 12/2009 | Consul | G06N 99/005 706/21 |
| 2010/0153315 A1 * | 6/2010 | Gao | G06F 17/3053 706/12 |
| 2011/0251707 A1 * | 10/2011 | Cheng | G05B 19/41875 700/100 |

(Continued)

OTHER PUBLICATIONS

Popa, L. et al., "DryadInc: Reusing work in large-scale computations" Proceedings of the 2009 conference on Hot topics in cloud computing (HotCloud) (Jun. 2009) pp. 1-5, Article No. 21.

(Continued)

Primary Examiner — Paulinho E Smith
(74) Attorney, Agent, or Firm — Scully, Scott, Murphy & Presser, P.C.; Rabin Bhattacharya

(57) ABSTRACT

A quality-directed adaptive analytic retraining is provided. Training example data with which to retrain a machine learning model that has been previously trained is received. The training example data is stored in a memory. The machine learning model is evaluated at least by running the machine learning model with the training example data. A normalized quality measure may be determined based on the evaluating. Whether to retrain the machine learning model is determined at least based on the normalized quality measure. Responsive to determining that the machine learning model is to be retrained, the machine learning model is retrained.

15 Claims, 12 Drawing Sheets

(56) References Cited

U.S. PATENT DOCUMENTS

| | | | | |
|---|---|---|---|---|
| 2012/0233127 | A1* | 9/2012 | Solmer | G06F 17/30073 707/661 |
| 2012/0284213 | A1* | 11/2012 | Lin | G06N 99/005 706/12 |
| 2013/0158840 | A1* | 6/2013 | Lu | F02D 41/2432 701/104 |
| 2013/0346351 | A1* | 12/2013 | Lin | G06N 99/005 706/21 |
| 2014/0376645 | A1* | 12/2014 | Kumar | H04N 19/89 375/240.27 |
| 2015/0235143 | A1* | 8/2015 | Eder | G16H 50/50 706/12 |
| 2015/0371132 | A1* | 12/2015 | Gemello | G06N 3/04 706/20 |
| 2016/0026923 | A1* | 1/2016 | Erenrich | G06Q 30/01 706/52 |
| 2016/0140845 | A1* | 5/2016 | Agrawal | G08G 1/14 340/932.2 |
| 2016/0162779 | A1* | 6/2016 | Marcus | G06N 99/005 706/12 |
| 2016/0217129 | A1* | 7/2016 | Lu | G06F 17/2785 |
| 2016/0371601 | A1* | 12/2016 | Grove | G06N 99/005 |
| 2017/0243133 | A1* | 8/2017 | Zavesky | G06N 99/005 |
| 2017/0319123 | A1* | 11/2017 | Voss | A61B 5/165 |
| 2017/0330109 | A1* | 11/2017 | Maughan | G06N 99/005 |
| 2017/0353991 | A1* | 12/2017 | Tapia | H04W 76/028 |
| 2018/0012145 | A1* | 1/2018 | Maurya | G06N 99/005 |

OTHER PUBLICATIONS

Bhatotia, P. et al., "Incoop: MapReduce for incremental computations" Proceedings of the 2nd ACM Symposium on Cloud Computing (SoCC '11) (Oct. 2011) pp. 1-14, Article No. 7.

Bhatotia, P. et al., "Slider: Incremental sliding window analytics" Proceedings of the 15th International Middleware Conference (Dec. 2014), pp. 61-72.

Giraph, "Welcoe to Apache Giraph!" http://giraph.apache.org/ (2011) 1 page.

Mahout, "What is Apache Mahout?" http:Nma.hout.a'.pache.org/ (Oct. 2011) 1 page.

Spark MLib, "Machine Learning Library (MLlib)", http://spark.apache.org/docs/1.1.1/mllib-guide.html (Jan. 2012) pp. 1-3.

Al-Khateeb, T. et al., "Stream classification with recurring and novel class detection using class-based ensemble" 2012 IEEE 12th International Conference on Data Mining (ICDM) (2012), pp. 31-40.

Arasu, A. et al., "Resource sharing in continuous sliding window aggregates" Conference on Very Large Data Bases (VLDB) (2004), pp. 1-24.

Bertsekas, D. "Nonlinear Programming" Athena Scientific (1995) pp. 1.1.12.

Bottou, L., "Online learning and stochastic approximations" Online learning in neural networks (1998) pp. 1-35.

Bu, Y. et al., "Ha.Loop: Efficient iterative data processing on large clusters" Conference on Very Large Data Bases (VLDB) (2010) pp. 285-296.

Chilimbi, T. et al., "Project Adam: Building an efficient and scalable deep learning training system" Proceedings of the 11th USENIX Conference on Operating Systems Design and Implementation, OSDI'14, USENIX Association (Oct. 2014) pp. 571-582.

Dean, J. et al., "Large scale distributed deep networks" NIPS (2012) pp. 1-11.

Dean, J. et al., "MapReduce: Simplified data processing on large clusters" Operating Systems Design and Implementation (OSDI) (2004) pp. 137-150.

Delimitrou, C. et al., "Quasar: Resource-efficient and qos-aware cluster management" Proceedings of the 19th International Conference on Architectural Support for Programming Languages and Operating Systems, ASPLOS '14, ACM, (Mar. 2014) pp. 127-144.

Ferdman, M. et al., "Clearing the clouds: A study of emerging scale-out workloads on modem hardware" ASPLOS XVII, ACM, (Mar. 2012) pp. 37-48.

Forgy, C.L., "Rete: A fast algorithm for the many pattern/many object pattern match problem" Artificial Intelligence (1982) pp. 17-37, vol. 19.

Gonzalez, J.E. et al., "Powergraph: Distributed graph-parallel computation on natural graphs" Proceedings of the 10th USENIX Conference on Operating Systems Design and Implementation, OSDI'12, (2012) pp. 17-30.

Griffin, T. et al., "Incremental maintenance of views with duplicates" International Conference on Management of Data (SIGMOD) (1995) pp. 328-339.

Gunda, P.K. et al., "Nectar: Automatic management of data and computation in datacenters" Operating Systems Design and Implementation (OSDI) (2010) pp. 1-14.

Hoi, S. et al., "Online multiple kernel classification" Machine Learning (2013) pp. 289-316, vol. 90, No. 2.

Isard, M. et al., "Dryad: Distributed data-parallel programs from sequential building blocks" European Conference on Computer Systems (EuroSys) (Mar. 2007) pp. 59-72.

Lloyd, S., "Least squares quantization in pcin" IEEE Transactions on Information Theory (Mar. 1982) pp. 129-137, vol. 28, No. 2.

Logothetis, D. et al., "Stateful bulk processing for incremental analytics" Symposium on Cloud Computing (SoCC) (Jun. 2010) pp. 51-62.

Low, Y. et al., "Distributed graphlab: A framework for machine learning and data mining in the cloud" Proc. VLDB Endow (Aug. 2012) pp. 716-727, vol. 5, No. 8.

Malewicz, G. et al., "Pregel: A system for large-scale graph processing" Proceedings of the 2010 ACM SIGMOD International Conference on Management of Data (SIGMOD '10) ACM (Jun. 2010) pp. 135-146.

Masud, M. et al., "A multi-partition multi-chunk ensemble technique to classify concept-drifting data streams" Pacific-Asia Conference on Advances in Knowledge Discovery and Data Mining (PAKDD) (2009) pp. 363-375.

McSherry, F. et al., "Differential dataflow" Conference on Innovative Data Systems Research (CIDR) (2013) pp. 1-12.

Mohri, M. et al., "Foundations of Machine Learning" The MIT Press (2012) pp. 6-7.

Niu, F. et al., "Hogwild!: A lock-free approach to parallelizing stochastic gradient descent" NIPS (2011) pp. 1-9.

IBM Operational Decision Manager: Decision Server Insights, http://www.ibm.com/support/knowledgecenter/SSQP76_8.7.0 (2014) 1 page.

Peng, D. et al., "Large-scale incremental processing using distributed transactions and notifications" Operating Systems Design and Implementation (OSDI) (2010) pp. 251-264.

Rennie, J. et al., "Tackling the poor assumptions of Naive Bayes text classifiers" Proceedings of the Twentieth International Conference on Machine Learning (2003) pp. 1-8.

Satish, N. et al., "Navigating the maze of graph analytics frameworks using massive graph datasets" SIGMOD'14 (Jun. 2014) pp. 979-990.

Shinnar, A. et al., "M3R: Increased performance for In-memory Hadoop jobs" Proceedings of the VLDB Endowment (Aug. 2012) pp. 1736-1747, vol. 5, No. 12.

Valiant, L.G., "A bridging model for parallel computation" Commun. ACM (Aug. 1990) pp. 103-111, vol. 33, No. 8.

Yun, H. et al., "Non-locking, stOchastic Multi-machine algorithm for Asynchronous and Decentralized matrix completion" Proceedings of the VLDB Endowment (Sep. 2014) pp. 975-986, vol. 7, No. 11.

Zhou, Y. et al., "Large-scale parallel collaborative filtering for the Netflix prize" Conference on Algorithmic Aspects in Information and Management (AAIM) (2008) pp. 337-348.

Mitchell, T.M., "Machine Learning", 1 ed. McGraw-Hill, Inc., New York, NY, USA (1997) pp. 178.

* cited by examiner

QUALITY-DIRECTED ADAPTIVE ANALYTIC RETRAINING

FIELD

The present application relates generally to computers and computer applications, and more particularly to middleware event processing systems, machine learning and training of a machine learning model.

BACKGROUND

Maintaining a high-quality big-data analytics model may not be easy when training data continue to change. For example, event-processing middleware can support high-quality reactions to events by providing context to the event agents. When this context consists of a large amount of data, it helps to train an analytics model for it. In a continuously running solution, this model should be kept up-to-date, otherwise quality degrades. However, ripple-through effects make training (whether from scratch or incremental) expensive.

BRIEF SUMMARY

A system and method of quality-directed adaptive analytic retraining may be provided. The method, in one aspect, may comprise receiving training example data with which to retrain a machine learning model that has been previously trained. The method may also comprise storing the training example data in a memory. The method may further comprise evaluating the machine learning model at least by running the machine learning model with the training example data. The method may also comprise determining a normalized quality measure based on the evaluating. The method may further comprise determining whether to retrain the machine learning model at least based on the normalized quality measure. The method may also comprise, responsive to determining that the machine learning model is to be retrained, retraining the machine learning model. In one aspect, the machine learning model is not retrained if it is determined that the machine learning model is not to be retrained.

A system for quality-directed adaptive analytic retraining, in one aspect, may comprise one or more processors operable to receive training example data with which to retrain a machine learning model that has been previously trained. A memory device may be operable to store the training example data. One or more of the processors may be further operable to evaluate the machine learning model at least by running the machine learning model on a processor with the training example data. One or more of the processors may be further operable to determine a normalized quality measure based on the evaluating. One or more of the processors may be further operable to determine whether to retrain the machine learning model at least based on the normalized quality measure. Responsive to determining that the machine learning model is to be retrained, one or more of the processors may be further operable to retrain the machine learning model. In one aspect, responsive to determining that the machine learning model does not need to be retrained, the training example data is accumulated without retraining the machine learning model.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment of the present disclosure, an analytics model may be maintained in which the model training costs are kept low while still maintaining high model quality. In one aspect, a quality-directed adaptive analytics retraining framework (AQuA) is provided that may incrementally track model quality and only retrain when necessary. In one embodiment, AQuA can identify both gradual and abrupt model drift.

In various embodiments, different retraining strategies may be implemented in AQuA, for example, including a sliding-window strategy. In one aspect, AQuA may be implemented over off-the-shelf big-data platforms.

Event processing middleware takes context into consideration to find the best reaction to events. This context often includes a large amount of data. Machine-learning analytics analyzes this context to make it actionable. For example, given the input event "end-user visits store", the event processor should make a product recommendation (e.g., which movie to rent, which book to buy, or which restaurant to dine at). The context for this prediction is what similar end-users liked or preferred, and the machine-learning problem is collaborative filtering (CF). One approach to building a context-aware event processor is to hand-integrate separate systems for event processing and analytics. However, in such an approach, the analytics extract the data, which may be brittle, involve a slow data copy, and lead to stale or low-quality models.

Figure 1:
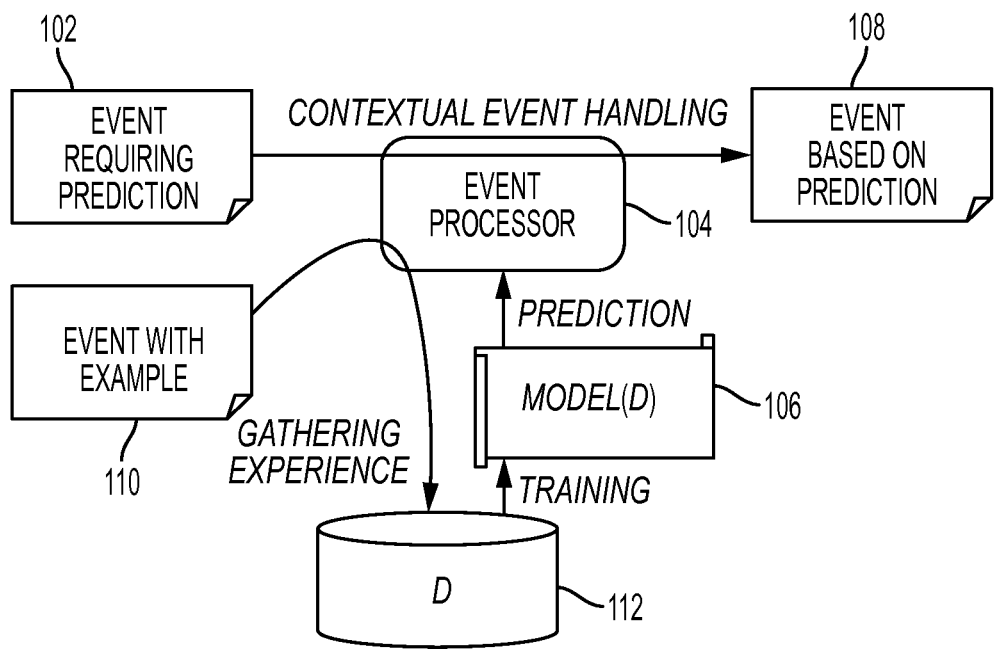
FIG. 1 illustrates components of a middleware that integrates event processing with analytics, which may use a technique of the present disclosure in one embodiment.

FIG. 1 illustrates components of a middleware that integrates even processing with analytics, which may use a technique of the present disclosure in one embodiment to keep its training costs low while maintaining high quality for its analytics model. The middleware shown in FIG. 1 in one embodiment is pre-integrated. Pre-integrated middleware leads to cheaper, more robust solutions, for example, since solution developers need not integrate by hand. Furthermore, since the analytics happen in-situ, they need not copy the data and can keep models fresher. Given an event requiring prediction (such as "end-user visits store") 102, an event processor 104 consults a pre-computed analytic model 106 to make a prediction, which is reflected in the output event 108. Given an event with an example (such as "user rates purchase") 110, the event processor 104 updates the stored training data D 112. Occasionally, the analytics train a new model Model(D) 106.

Given a middleware such as the one shown in FIG. 1, one simple approach may be to retrain on a fixed schedule. However, such a approach may yield an arbitrary cost/quality trade-off that may be suboptimal. A more sophisticated approach is incremental analytics. However, many analytics are not available in incremental form; ripple-through effects can cause incremental analytics to have high cost; and the resulting model is not guaranteed to have the best quality when obsolete examples remain in the training data.

Figure 2:
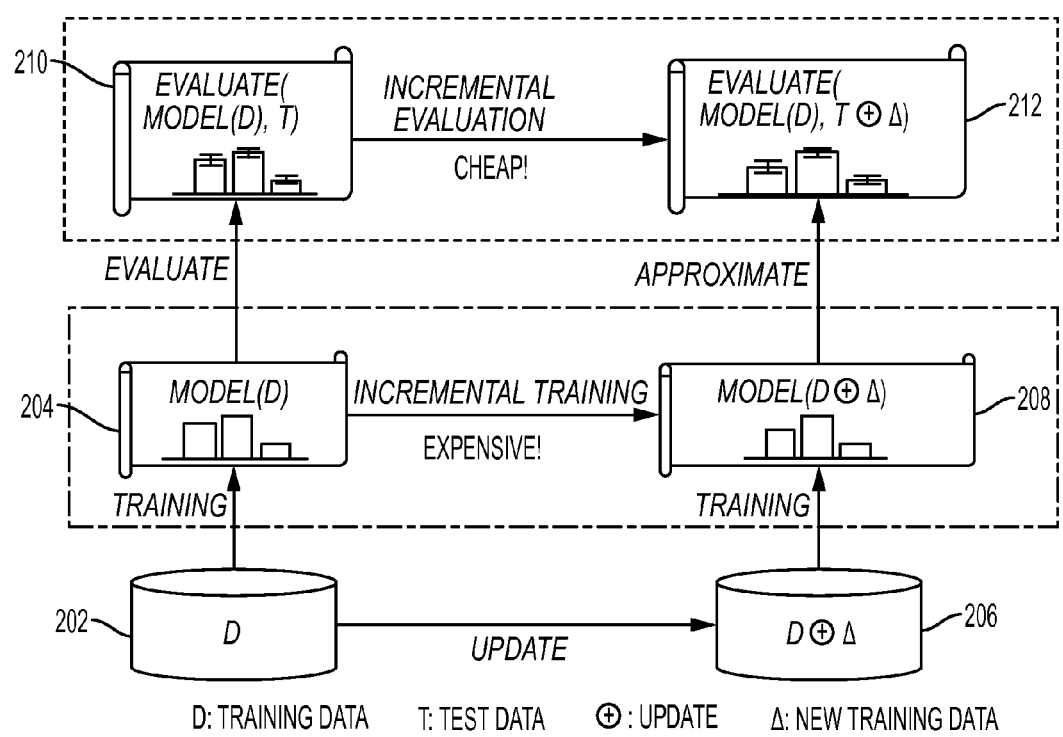
FIG. 2 is a diagram showing an AQuA approach compared with incremental analytics in one embodiment of the present disclosure.

A technique is disclosed in the present disclosure in one embodiment referred to as AQuA that provides a complementary approach, for example, to keep the model quality high and the training cost low. In one embodiment, rather than performing incremental training, AQuA incrementally evaluates model quality. Such an approach makes it possible to meet a user-specified quality threshold, and may be easy to do and inexpensive. FIG. 2 is a diagram showing an AQuA approach compared with incremental analytics in one embodiment of the present disclosure. Given the initial training data D 202, a machine-learning algorithm constructs an initial model Model(D) 204. When an update changes the training data to D ⊕ Δ 206, there may be two approaches for constructing an updated model Model(D ⊕ Δ) 208: either retraining from scratch (e.g., shown by the arrow from 206 to 208) or incremental training (shown by the arrow from 204 to 208). When D is large, retraining from scratch takes minutes or even hours of computing time. Also, incremental training may be also expensive. For example, even when the update Δ is small, subtle changes can ripple through the entire model, and retraining cost depends on the size of D, not Δ.

An embodiment of the present disclosure incrementally evaluates the model by treating new training data as test data, for example, shown at 210 and 212. For instance, popular algorithms for common machine learning problems (clustering, classification, and collaborative filtering) may be evaluated on real-world datasets. Most of these algorithms are statistical and approximate in nature: exact solutions are often infeasible. It is usually much faster to incrementally evaluate than to incrementally train a model. By treating new training data as test data, the system and/or method of the present disclosure in one embodiment can quickly evaluate a model's quality during updates, and detect when it degrades. Furthermore, in the presence of gradual or abrupt model drift, it is not always desirable to incrementally update the model without discarding (some) old data. Hence, in one embodiment of the present disclosure, the system and/or method may perform continuous incremental evaluation, but retraining only on-demand, e.g., responsive to determining that model quality drops below a threshold.

In one aspect, a novel unified approach is provided for incremental evaluation of different machine learning algorithms. How a model's quality changes on new data is characterized using real-world dataset. Prioritizing recent data over older data yields a near-optimal quality/cost tradeoff. A retraining strategy is presented based on sliding windows. Such retraining strategy improves machine performance, may be easy to implement, and requires no change to the underlying machine-learning infrastructure. In another aspect, an approach is also presented for handling (some forms of) abrupt model drift by detecting the change point and using only data from after that point for retraining. It is observed that incremental evaluation is faster than incremental training, and enables cheaply maintaining a high-quality model over changing data.

The following description illustrate machine-learning concepts with example from collaborative filtering (CF).

Examples. Data instances used for training or evaluation, e.g., a triple {user,movie,rating}.

Features. The set of attributes, often represented as a vector, associated with an example, e.g., a user feature vector or a movie feature vector.

Labels. Values or categories assigned to examples, e.g., a movie rating.

Supervised learning. The learner sees some labeled examples and makes predictions for other unlabeled examples. CF and classification are supervised learning problems.

Unsupervised learning. The learner sees some unlabeled examples and makes predictions for other unlabeled examples. Clustering is an unsupervised learning problem.

Training data D. Examples used to train a model.

Test data T. Examples used to evaluate the quality of a model. For example, in CF, one can use some labeled movie ratings as training data and hold out the rest as test data. In unsupervised learning, the test data and the training data are the same.

Loss function. A function that measures the difference, or loss, between a predicted label and a true label. A typical loss function for CF is RMSE (root mean square error), defined in Equation (7).

Cost function C. Most machine learning algorithms solve the following optimization problem:

$$\operatorname*{argmin}_{\Theta} C(\Theta, D) \quad (1)$$

where C is the cost function, D is the given training data, and Θ is the solution to this optimization problem. A cost function for CF is given in Equation (3).

Model Θ. A solution to the optimization problem in Equation (1).

Predict. Apply a model on an unlabeled example to yield a label.

Train. Solve the optimization problem in Equation (1).

Training algorithm. An algorithm used to train a model, e.g., ALSWR (Alternating-Least-Squares with Weighted-λ-Regularization) for CF.

Problem. A machine learning problem includes training a model to make predictions on unseen examples.

Evaluation. Evaluation of a supervised learning model means applying the loss function to the model and the test data. Because labeled examples are generally not available, evaluation of an unsupervised learning model is more difficult. However, it is observed that the training algorithm considers one model superior to another if it yields a smaller cost value. Therefore the cost function can serve as an evaluation metric.

Quality. The result of evaluating a model. The system and/or method of the present disclosure in one embodiment normalizes quality so higher values indicate better quality. E.g., quality of CF is the reciprocal of RMSE.

In one embodiment of the present disclosure, adaptive analytics are only necessary when model quality degrades on new data. If the quality of an old model on new examples did not degrade, then a middleware system or the like may continue to use the old model.

New training data Δ. Examples that become available only after the initial model is trained.

Model drift. The phenomenon that an old model does not accurately predict new data. Model drift happens when new training examples cause models to change, either gradually or abruptly. In CF, gradual model drift can be caused by scenarios such as users rating new movies; abrupt model drift by many users suddenly changing their taste.

Incremental training. Update the model to reflect new training data Δ.

Incremental evaluation. For supervised learning, make a prediction and incrementally update the loss function. For unsupervised learning, make a prediction and incrementally update the cost function.

AQuA, a general framework for quality-directed adaptive analytic retraining in one embodiment of the present disclosure is based on an observation that incremental evaluation is much cheaper than incremental training and continuous incremental evaluation enables retraining-on-demand, which effectively balances model quality against training effort. This technique may apply to a wide range of analytics algorithms. For example, AQuA applies to a diversity of analytics: any unsupervised learning algorithm that has a loss function defined and any supervised learning algorithm that has a cost function defined. AQuA may be applied to any machine-learning framework that implements such algorithms. In one aspect, AQuA treats the underlying framework as a black box and may be implemented with one or more APIs. An example framework may include MAHOUT from Apache Software Foundation, which for example, supports a wide range of learning algorithms and is a stable big-data analytics engine.

Figure 3:
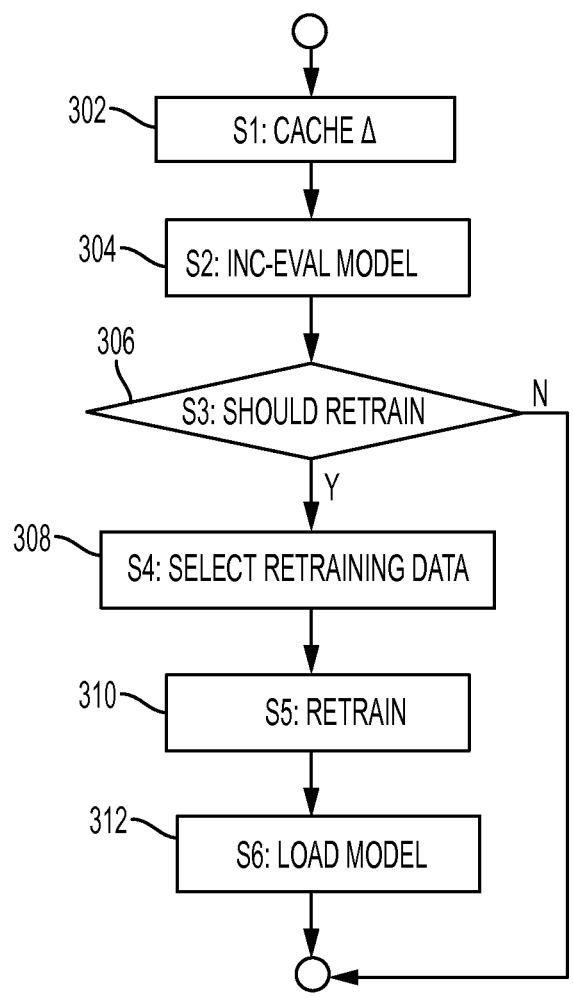
FIG. 3 is a flow diagram showing an overall workflow of a quality-directed adaptive analytic retraining in one embodiment of the present disclosure.

FIG. 3 is a flow diagram showing an overall workflow of a quality-directed adaptive analytic retraining in one embodiment of the present disclosure, for instance, given that an initial model has been trained and evaluated. The workflow shown in FIG. 3 is performed in one embodiment, responsive to receiving an incoming training example Δ, for example, when an incoming training example Δ arrives. At 302, add Δ to the cache. The cache design is described below in detail. For unsupervised learning, Δ is placed or stored in the training cache. For supervised learning, Δ is placed or stored in an evaluation cache with a user-specified probability p and in the training cache otherwise.

At 304, incrementally evaluate the model. For instance, first, AQuA may perform a prediction for Δ. Second, AQuA incrementally updates the loss function for supervised learning or the cost function for unsupervised learning.

At 306, it is determined whether the model or algorithm should be retrained. In one embodiment, different tests may be performed depending on different retraining strategies. For example, it may be determined or judged as to whether the quality of the model is below a quality threshold set for retraining criteria. The processing at 308, 310 and 312 are performed in one embodiment responsive to determining that the model should be retrained, for example, the quality of the model is below the quality threshold, and thus retraining is needed.

At 308, select retraining data, if retrain is needed. A plurality of retraining data selection strategies may be provided. For instance, AQuA may implement several retraining data selection strategies, for example, described below.

At 310, retrain model using the selected training data.

At 312, load the retrained model.

Figure 4:
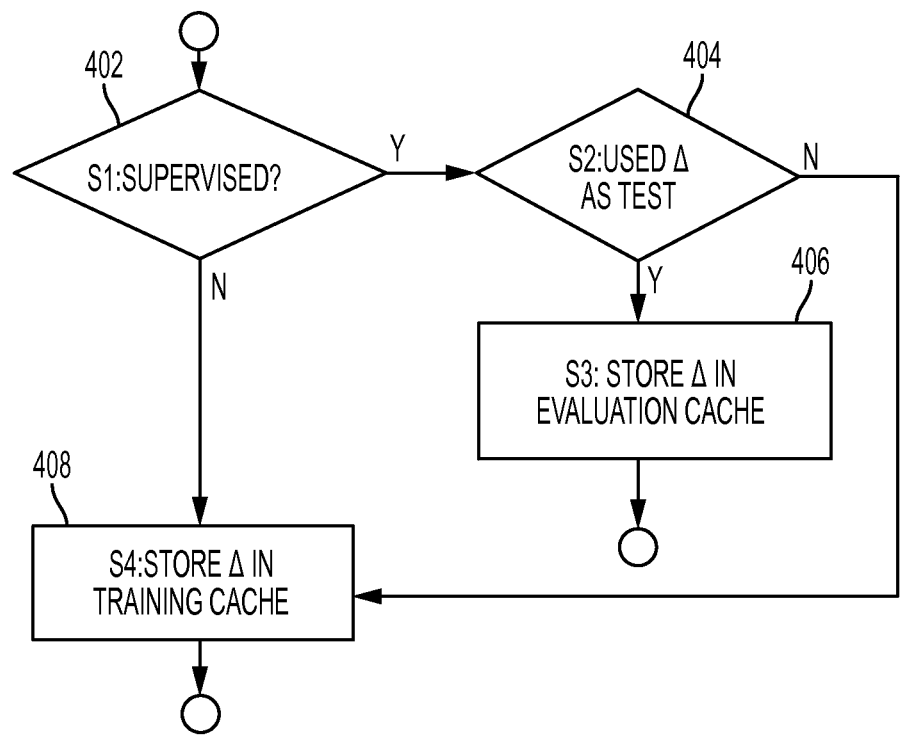
FIG. 4 is a flow diagram illustrating a method of adding incoming training examples in a cache in one embodiment of the present disclosure.

FIG. 4 is a flow diagram illustrating a method of adding incoming training examples in a cache in one embodiment of the present disclosure. At 402, it is determined whether the machine learning algorithm is a supervised learning algorithm. Responsive to determining that the machine learning algorithm is a supervised learning algorithm, it is determined at 404, whether the training examples should be used as a test set. If it is determined that the training examples are to be used as a test set, the training examples are stored in an evaluation cache at 406; otherwise, the training examples are stored in a training cache at 408. At 402, if it is determined that the machine learning algorithm is not a supervised learning algorithm, the training examples are stored in a training cache at 408.

The following describes interfaces to algorithms and data stores, and a suite of retraining strategies in one embodiment of the present disclosure.

Algorithm Interface

In one embodiment of the present disclosure, an algorithm interface is provided. For example, a class object may be provided as an interface a machine learning algorithm to implement to take advantage of quality-directed adaptive analytic retraining of the present disclosure in one embodiment. As an example, the class object may be named AquaAlgo class. Any other names may be selected as the class object for an algorithm interface. In one embodiment, the methods defined in this class may include train, predict, evaluate, incrementalTrain and incrementalEvaluate. Since such methods are central to any given machine learning algorithm, any machine learning frameworks should have them in place or be easy to modify to add such methods.

In one embodiment, the algorithm interface, e.g., AquaAlgo, normalizes a model's running quality against its initial quality. For example, higher normalized quality is better. The algorithm interface, AquaAlgo, makes a retraining decision when the normalized quality is under a threshold. The threshold may be user-specified and may be configurable.

In one embodiment, AQuA places a training and evaluation cache between the algorithm interface, AquaAlgo, and an underlying distributed data store. Depending on a retraining strategy, which may be specified by a user, the algorithm interface, AquaAlgo, retrieves the corresponding data from the cache.

Store Interface

Cache in AQuA manages training and test data storage. In one embodiment, Cache may be implemented on top of Hadoop File System (HDFS) or the like. HDFS is the underlying file system for MAHOUT and many other machine learning frameworks. The design of Cache is independent from the underlying distributed file system and can be easily implemented for a different one.

Figure 5:
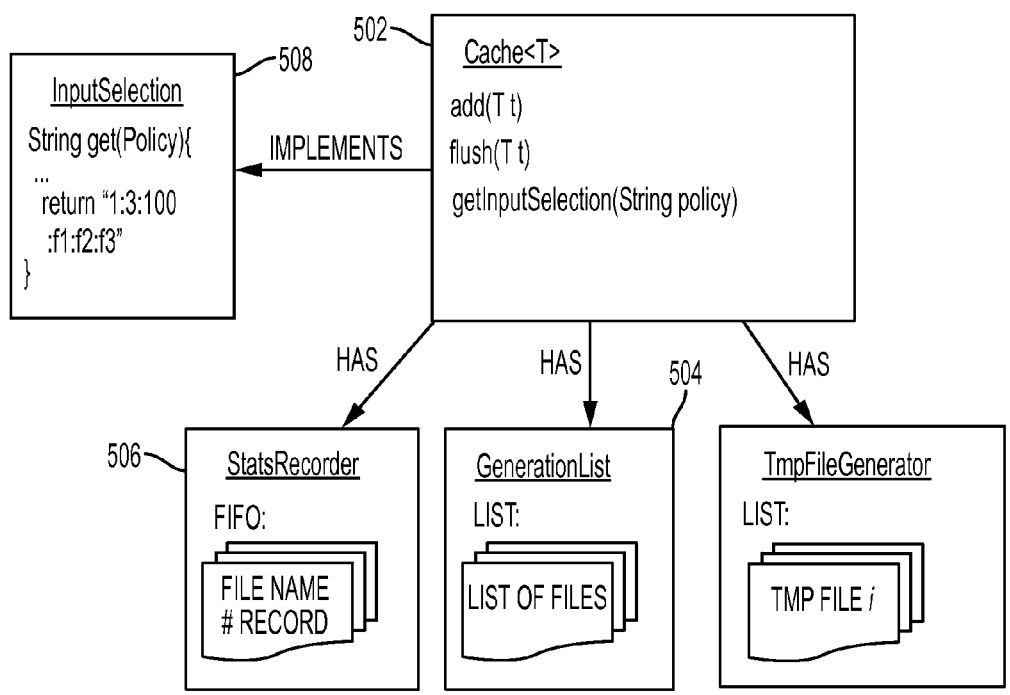
FIG. 5 shows a design for a store interface, Cache, in one embodiment of the present disclosure.

FIG. 5 shows a design for a store interface, Cache, in one embodiment of the present disclosure. A store interface, e.g., referred to as Cache 502, may be provided that keeps examples in memory and flushes them to an HDFS file or the like when their number reaches a threshold, e.g., user-specified threshold. It 502 also provides a public flush method, which the algorithm interface, AquaAlgo, calls before retraining. Cache 502 ensures each flush goes to a unique file. In addition, Cache 502 manages meta-data for training and test data, e.g., by maintaining two data structures. A generation list 504 keeps track of flushed HDFS files or the like between retrainings. A stats recorder 506 records flushed HDFS file locations (or like file locations) and how many examples each file contains. Cache 502 implements an input selection object 508, for example, for selecting input data for training.

Cache can use the generation list 504 to retrieve all data between retrainings. Cache can use stats recorder 506 to implement a packing method that, given a target number of required examples, returns a list of the most recent cache files that in total contain roughly the target number.

Retraining Strategies

In one embodiment, AQuA may implement a plurality of retrain strategies. Examples of retrain strategies are described in Table 1. Column Strategy lists the strategy names; column S3 describes the retrain condition for step 306 from FIG. 3; and column S4 describes the training data selection for step 308 from FIG. 3.

TABLE 1

Retraining strategies

| Strategy | Retrain condition (FIG. 3, 306) | Training data (FIG. 3, 308) |
|---|---|---|
| Fix | When the number of examples since the last retraining exceeds a fixed threshold, irrespective of quality. | Training data collected since last retraining. |
| All | Model quality falls below a threshold. | All training data since the beginning of time. |
| Gen: generation. | Model quality falls below a threshold. | Training data since the last retraining. |
| Sw: sliding window. | Model quality falls below a threshold. | A fixed amount (w) of the most recent training data. |

A quality threshold can be too high to maintain, so frequent retraining would be incurred. For instance, if a quality threshold is set to high, retraining may be needed to be performed frequently to meet that threshold. To alleviate this problem, AQuA may also provide a parameter inertia window, e.g., for a user to specify. AQuA will hold at least inertia window data items before a retraining. That means that quality-directed strategies effectively fall back to the fixed-size strategy when the quality threshold is unrealistically high. The inertia window prevents AQuA from overreacting to early quality instability. Model quality is reset after retraining, and when evaluated on only few examples, model quality is not representative.

The above-described quality referred to overall quality, which is based on all examples used during incremental evaluation, with uniform weight. In one embodiment of the present disclosure, additional quality metrics may be defined and used for detecting and reacting to abrupt model drift. To characterize how a model performs on more recent data, a method of the present disclosure in one embodiment uses known technique in statistical science, the Exponential Moving Average (EMA). Consider a time series $Q=\{q_1, \ldots, q_n\}$, where $q_i$ is the model quality evaluated by using the i-th example. Then, Equation (2) defines the EMA $\alpha$ of model quality:

$$\alpha_{i+1} = \alpha_i \cdot (1-p) + q_{i+1} \cdot p \quad (2)$$

$$\alpha_1 = q_1$$

The older an example, the less it contributes to the EMA. In theory, p can be set between 0 and 1; in practice, p is usually below 0.1, because a larger p assigns too much weight to the recent data. However, $\alpha$ defined in Equation (2) is not practical if there is a need to look at a relatively long history. When p=0.05, an example of age 15,000 has weight $0.95^{15,000}$, which is indistinguishable from 0 using double floating point precision. Thus, the method of the present disclosure in one embodiment may divide the test data into consecutive chunks of size s and record the model quality evaluated by each chunk, which is called chunk quality, $CQ=\{cq_1, \ldots, cq_j\}$, where $s \cdot j = n$. The method may use CQ instead of Q in Equation (2) to calculate a model's EMA, which is called EMA quality.

Incremental updates to overall quality, chunk quality, and EMA quality have complexity O(1).

Handling Abrupt Model Drift

The method in one embodiment may use a simple heuristic to detect abrupt model drift. If EMA quality drops at least 10% below overall-quality, the method detects a change point. Hundreds of experiments conducted on real-world dataset with different values for p (EMA probability) and s (EMA chunk size) find this heuristic to be effective: it has neither false positives nor false negatives.

When AQuA detects a change point, it waits for a user-specified number of additional incoming examples before it starts retraining, using only training data from after the change point. The data AQuA holds before it starts retraining is called hold-data.

Abrupt model drift handling is orthogonal to the retraining strategies described. That is, only when an abrupt model drift is detected, AQuA retrains the model using the hold-data. One can freely choose different retraining strategies (e.g., sliding-window) to handle the gradual model drift.

Figure 6:
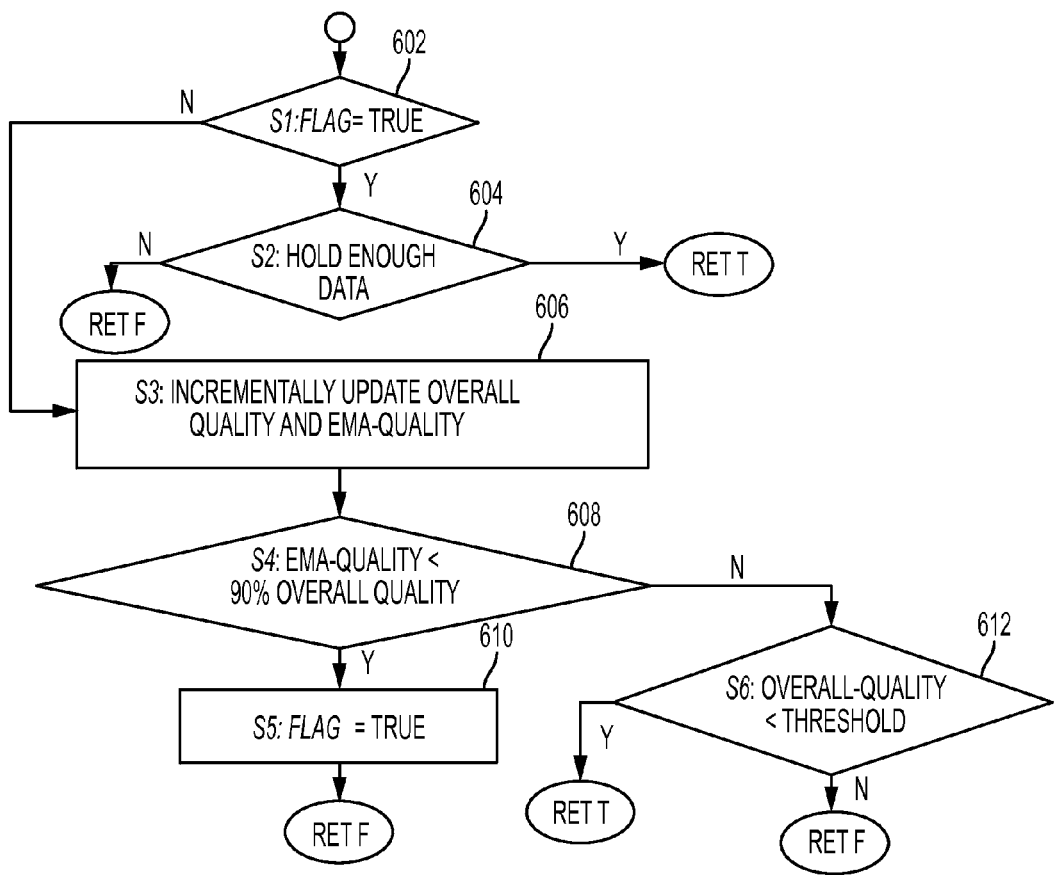
FIG. 6 illustrates a flowchart of abrupt model drift detection in one embodiment of the present disclosure.

FIG. 6 illustrates a flowchart of abrupt model drift detection in one embodiment of the present disclosure. At 602, check if the abrupt model change flag is set true. At 604, if the check from 602 is true, check if enough training data is held since the change point was detected. If there is enough training data, then return true to signal that a retraining should start. At 606, incrementally update overall and EMA quality. At 608, check if EMA quality is a threshold percentage, e.g., 10%, lower than the overall quality to detect the abrupt model change point. At 610, if the check from 608 is true, set the abrupt model change flag to be true, and return false. At 612, check if the overall-quality is lower than the user specified threshold to detect if a retraining should be triggered due to gradual model drift.

The following describes surveys of three representative machine learning problems (collaborative filtering, clustering, and classification) performed to understand the computational complexity of incremental training and incremental evaluation described above. For each problem statement, the following description presents a popular training algorithm, an evaluation algorithm, and a complexity analysis. The following surveys demonstrate that incremental evaluation of the present disclosure is usually much cheaper, e.g., in terms of computer resources, than incremental training.

Collaborative Filtering

Collaborative filtering (CF) may be used to recommend items to users of the same interest. It is a supervised learning problem. An example is described with respect to data assocaited with user movie ratings. Formally, let I be the index set of known ratings, and $I_i$ the set of movies user i has rated. CF learns a model that can predict user i's ratings on movies that are not in $I_i$.

Training

ALSWR (Alternating-Least-Squares with Weighted-$\lambda$-Regularization) is a CF algorithm.

Optimization Problem

ALSWR is a form of matrix completion problem. It treats each rating $r_{i,j}$ as an entry in a rating matrix R and solves optimization problem (3).

$$\underset{U,M}{\operatorname{argmin}} \sum_{(i,j) \in I} (r_{i,j} - u_i^T m_j)^2 + \lambda \left( \sum_i n_{u_i} \|u_i\|^2 + \sum_j n_{m_j} \|m_j\|^2 \right) \quad (3)$$

U is the feature-user matrix, $u_i$ is user i's feature vector. M is the feature-movie matrix, $m_j$ is the movie j's feature vector, $n_{u_i} = |I_i|$, and $n_{m_j} = |I_j|$, where $I_j$ denotes the set of users who rated movie j. $\Sigma_{i,j \in I}(r_{i,j} - u_i^T \cdot m_j)^2$ is the squared difference between actual rating and predicted rating. $\lambda(\Sigma_i n_{u_i} \|u_i\|^2 + \Sigma_j n_{m_j} \|m_j\|^2)$ is the Tikhonov regularizes to avoid overfitting. U and M are the model to learn.

Training Algorithm

Minimizing a given column of $u_i$ is equivalent to solving PDE (4):

$$\frac{1}{2} \frac{\partial f}{\partial u_i} = 0, \forall i \quad (4)$$

It can be shown that solving Equation (5) can yield the solution to Equation (4):

$$(M_{I_i} M_{I_i}^T + \lambda n_{u_i} E) u_i = M_{I_i} R^T(i, I_i) \quad (5)$$

E is the $n_f \times n_f$ identity matrix, $n_f$ is the feature vector size of each user i and movie j. $M_{I_i}$ denotes the sub-matrix of M where columns $j \in I_i$, are selected, and $R(i, I_i)$ is the row vector where columns $j \in I_i$ of the i-th row of R is taken. One can deduce a similar formula for solving $m_j$ in $$(U_{I_j} U_{I_j}^T + \lambda n_{m_j} E) m_j = U_{I_j} R(I_j, j) \quad (6)$$

$U_{I_j}$ denotes the sub-matrix of U where columns $i \in I_j$ are selected, and $R(I_j, j)$ is the column vector where rows $i \in I_j$ of the j-th column of R is taken.

Incremental Training Complexity

When a new rating $r_{k,j}$ arrives, ALSWR must solve at least two systems of equations ($n_f$ unknowns each), one for user k and one for movie j. Thus the best-case complexity is $O(n_f^3)$. If user k previously rated other movies, and movie j was rated by other users, then the corresponding movies and users' feature vectors will be updated too, and so on and so forth. Thus the worst-case complexity is $O(i(n_u + n_m)n_f^3)$, where i is the number of iterations, i.e., as bad as training from scratch.

Evaluation

Prediction

For a user i and movie j, the predicted label is $u_i^T \cdot m_j$. The complexity is $O(n_f)$.

Loss Function

Assume $y_i$ is the true label, $y_i'$ is the predicted label, and n is the number of predictions. The method of the present disclosure in one embodiment uses RMSE, defined in Equation (7), as the loss function. Incremental update to RMSE is of O(1) complexity.

$$\sqrt{\frac{\sum_{i=1}^n (y_i - y_{i'})^2}{n}} \quad (7)$$

Normalized Quality

Initial loss function value divided by current loss function value.

Incremental Evaluation Complexity

Incremental evaluation uses an $O(n_f)$ prediction and an O(1) update to the loss function, so its complexity is $O(n_f)$.

Clustering

Problem Statement

Clustering partitions a set of examples into homogeneous regions. It is an unsupervised learning problem. Formally, given a set of points $\{x_1, x_2, \ldots, x_n\}$, where each point is a d-dimensional real vector, clustering partitions the n points into k sets $S = \{S_1, \ldots, S_k\}$.

Training

In one embodiment of the present disclosure, KMeans is used as a clustering algorithm in this example.

Optimization Problem Formalization

KMeans minimizes the sum of distance between each point and its cluster's centroid, as defined in optimization problem (8). The method in one embodiment of the present disclosure denotes the k centroids as $C = \{C_1, \ldots, C_k\}$.

$$\underset{S,C}{\operatorname{argmin}} \sum_{i=1}^k \sum_{x \in S_i} \|x - C_i\|^2 \quad (8)$$

S and C are the model to learn.

Training Algorithm

The optimization problem in Equation (8) is known to be NP-hard. KMeans adopts an iterative approach to approximate the results. It starts by randomly picking k centroids from the n points. Then, it iterates over the following two steps until every centroid converges to within a user-defined distance $\varepsilon$: (1) assign each point to its closest centroid; (2) update each centroid to the average of all the points assigned to it. The method in one embodiment of the present disclosure denotes number of iterations as i The training complexity is O(iknd).

Incremental Training Complexity

Given an incoming point x, to incrementally train the model, one needs to first predict the new point's membership, which is of O(kd) complexity. Then one needs to update the centroid of the cluster to which x is assigned. Further, one needs to calculate the pairwise distance between all points with the updated centroid, which is of O(nd) complexity. If any point changes cluster membership, then affected clusters need to recompute centroids. Therefore, the worst-case complexity is O(iknd).

Evaluation

Prediction

To predict the cluster for a point x, calculate the distance between x and each $C_i$, and assign it to the closest $C_i$. The complexity is O(kd).

Normalized Quality

Initial average distance divided by the current average distance.

Incremental Evaluation Complexity

Since KMeans is a unsupervised learning algorithm, incremental evaluation involves one O(kd) prediction and one O(1) update to the cost function in optimization problem (8), for a total complexity of O(kd).

Classification

Problem Statement

Classification assigns a category to each example. It is a supervised learning problem. Formally, let $X=\{x_1, \ldots, x_n\}$ be a training set, where each $x_i$ is a d-dimensional feature vector. Let the labels corresponding to X be $\{v_{x_1}, v_{x_2}, \ldots, v_{x_n}\}$, where each $v_{x_1}$ belongs to some finite set V of size k. Classification predicts a label $v_j \in V$ for an unseen point $x_{i'}$.

Training

The method in one embodiment of the present disclosure uses CNB (Complementary Naive Bayes) as a classification algorithm. CNB is known to work well with skewed training data, i.e., when there are more training examples for one class than another.

Optimization Problem Formalization

The CNB approach to classifying the new example with feature vector $\langle a_1, \ldots, a_d \rangle$ is to assign a least probable target value that this instance does not belong to, by solving optimization problem (9):

$$\underset{v_j \in V}{\mathrm{argmin}} P(\neg v_j | a_1, \ldots, a_d) \quad (9)$$

By applying Bayes' rule and assuming features are mutually independent, one can rewrite the optimization problem (9) into optimization problem (10), where $p(v_j)$ is the frequency of class $v_j$ in the training set, $$N_{v_j^\neg i}$$

is the frequency of feature i in classes other than $v_j$, and $$N_{v_j^\neg}$$

is the total number of any feature occurrences in classes other than $v_j$. $\alpha i$ and $\alpha$ are smoothing parameters.

$$\underset{v_j \in V}{\mathrm{argmax}} \left( \log p(v_j) - \sum_{i=1}^{d} f_i \cdot \log \frac{N_{v_j^\neg i} + \alpha_i}{N_{v_j^\neg} + \alpha} \right) \quad (10)$$

$p(v_j)$, $$N_{v_j^\neg i}, \text{ and } N_{v_j^\neg}$$

are the model to learn.

Training Algorithm

Due to its simplicity, CNB is not an iterative algorithm and can build its model in one pass, by simply counting $p(v_j)$, $$N_{v_j^\neg i}, \text{ and } N_{v_j^\neg}.$$

Incremental Training Complexity

Given a new example x and its label v, one needs to update $$N_{v i}^\neg$$

for x's d matures and $$N_{v_j^\neg}$$

for all $v_j$ is nut v. Inc complexity is O(kd) (d?k).

Evaluation

Prediction

To make a prediction for a feature vector $\langle \alpha_1, \ldots, \alpha_d \rangle$, one needs to evaluate the cost function of optimization problem (10) k times and find the minimum one. The computational complexity is O(kd).

Loss Function

Given n predictions, assume $v_i$ is the true label and $v_i'$ is the predicted label for the i-th prediction. The method in one embodiment of the present disclosure uses (11) as the loss function, where $\Delta_i = 1$ if $v_i \neq v_i$.

$$n - \sum_{i=1}^{n} \Delta_i, \quad (11)$$

Normalized Quality

Initial loss function value divided by current loss function value.

Incremental Evaluation Complexity

Incremental evaluation requires an O(kd) prediction and an O(kd) update to the loss function, for a total complexity of O(kd).

Summary of Complexity Analysis

TABLE 2

Computational complexity analysis of training, incremental training, and incremental evaluation of widely used machine learning algorithms.

| Algorithm | Training | IncTrain (best) | IncTrain (worst) | IncEval |
|---|---|---|---|---|
| KMeans | O(iknd) | O(nd) | O(iknd) | O(kd) |
| ALSWR | O(i($n_u$ + $n_m$)$n_f^3$) | O($n_f^3$) | O(i($n_u$ + $n_m$)$n_f^3$) | O($n_f$) |
| CNB | O(nd) | O(kd) | O(kd) | O(kd) |
| NB | O(nd) | O(d) | O(d) | O(kd) |
| LinReg | O(ind) | O(nd) | O(ind) | O(d) |
| LogReg | O(ind) | O(nd) | O(ind) | O(d) |
| NN | O(ind*) | O(nd*) | O(ind*) | O(d*) |

Table 2 summarizes the time complexity of seven example machine learning algorithms. In addition to the three discussed in detail above, it adds Naive Bayes (NB), Linear Regression (LinReg), Logistic Regression (LogReg) and Neural Network (NN). NB is a similar algorithm to CNB, but usually has the worst performance. LinReg, LogReg and NN are more advanced classification techniques that are based on a Stochastic Gradient Descent (SGD) solver, i is the number of iterations to run SGD solver on the entire training dataset (typically a number between 1 and 100), n is the size of training dataset, d is the training data feature dimension in LinReg and LogReg, d* is the parameter size in NN.

Incremental evaluation is usually much faster than incremental training. Further, the total cost of running m incremental trainings is usually significantly higher than batching m training data items together and run the training algorithm over them once. This indicates that one should batch training examples and (incrementally) train the model only at the carefully-selected points. The only pathological case is NB, whose incremental training is faster than incremental evaluation. It was observed that NB is the only learning method that does not explicitly search the space of possible hypotheses.

In distributed machine learning frameworks, the time complexity of incremental training can be much higher than the numbers presented in Table 2. That is because the delta-tracking granularity is only practical at a coarse level (e.g., per HDFS block). Further, while incremental evaluation does not incur any extra space cost, incremental training usually requires significantly more space.

The following describes experimental or practical application of AQuA on example data sets, and results thereof. The experimental description below is intended to be an example only, and does not limit the system, method and/or techniques of the present disclosure described herein.

Experimental Methodology

AQuA is largely independent from the specific machine learning algorithm and underlying implementation framework. To evaluate its utility, it is sought to realistically simulate scenarios in which predictive analytics are being applied to an incoming data stream. This implies a need for large datasets with timestamped elements.

Datasets

The NETFLIX and Wikipedia datasets are the largest publicly available datasets that meet this criteria. The NETFLIX dataset is 1.4 GB and contains 100 million (user, movie, rating) examples from 1998 to 2005. Ratings range from 1 (least favorite) to 5 (most favorite). The Wikipedia dataset is 44 GB and contains all Wikipedia documents from 2002 to August, 2014 (over 14 million documents). Both datasets have been used extensively in big data research.

Data Preprocessing

For the purpose of evaluating model quality for CNB, the present disclosure assigns a ground truth label to each Wikipedia document. A method of the present disclosure in one embodiment may do this by using the categories assigned by human editors to the document. By sampling 25 popular categories (e.g., science) a method of the present disclosure in one embodiment may define a subset of the dataset that contains over 2 million documents. For KMeans, a method of the present disclosure in one embodiment may use Cosine distance between the vectors. A method of the present disclosure in one embodiment may use standard tf-idf vectorization to obtain a numerical representation of each Wikipedia document. Using a sparse vector representation, the size of the dataset is 8 GB (multiple orders of magnitude smaller than using dense vectors).

Software and Hardware Infrastructure

An example of a base learning framework that may utilize the method or techniques of the present disclosure may include MAHOUT. In one aspect, since exploring distributed scale-out is not the primary goal, all experiments may be run on two large servers to minimize the wall clock time needed for the study. One server has 20 2-way SMT 2.4 GHz Intel Xeon cores and 260 GB of memory; the other has 16 2-way 2.0 GHz cores and 130 GB of memory.

Experimental Results

This section presents the results of experiments designed to evaluate five fundamental aspects of AQuA:

How does each retraining strategy trade off training cost against model quality? Is a quality-directed retraining system better than the quality-oblivious one?

What is the right retraining strategy when there is abrupt model drift?

Does training with all the available data always yield a better model?

Ignoring training cost, how does the quality achieved by AQuA compare to that of an incremental training system?

What AQuA parameters should a user tune?

Evaluating Retraining Strategies

Experimental Setup

The whole-world (e.g., the entire data set, e.g., 100 million ratings in NETFLIX and over 2 million documents in Wikipedia.) data is sorted by timestamp. The present disclosure may use the oldest 20% of the whole-world data as training data to generate an initial model. The remaining 80% of the data is presented in timestamp order to AQuA as an incoming training data stream.

Experiment Evaluation Metrics

Graphically

FIGS. 7A-7F and 8A8B plot the reciprocal of quality (y axis) against the retraining effort (x axis). The quality is measured via accumulative chunk-quality. The retraining effort is measured in number of training examples and retraining time (in seconds). On both axes, lower is better.

Figure 7A:
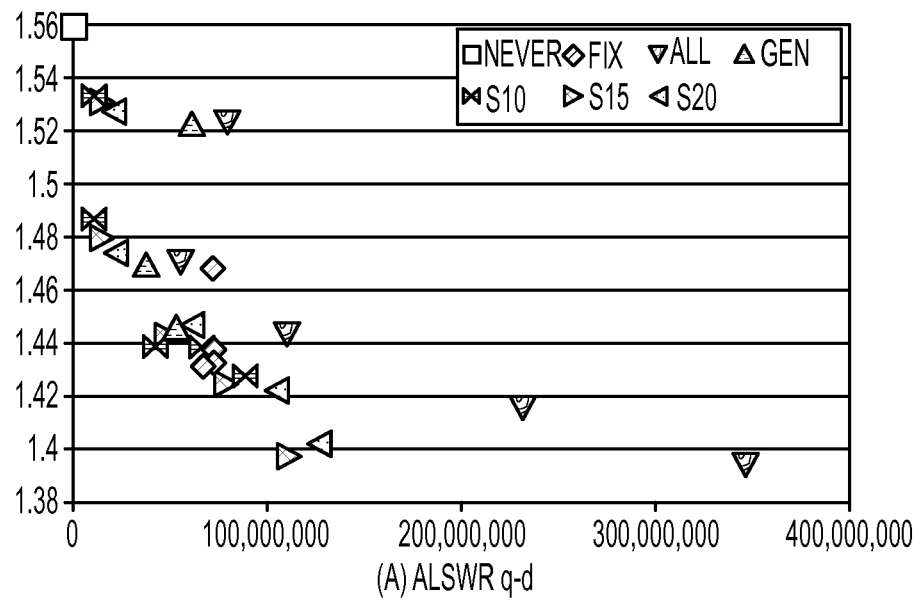
FIGS. 7A, 7C and 7E illustrate graphically plot quality vs. training data size, measured in number of training data examples (i.e., q-d plot) in one embodiment of the present disclosure.
Figure 7B:
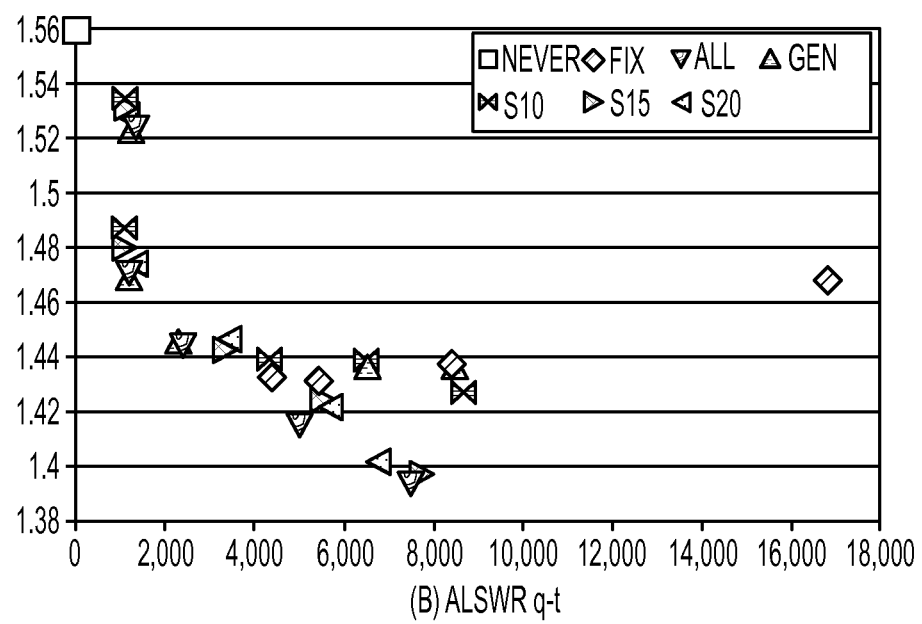
FIGS. 7B, 7D and 7F illustrate graphically plot quality vs. training time, measured in seconds (i.e., q-t plot) in one embodiment of the present disclosure.
Figure 7C:
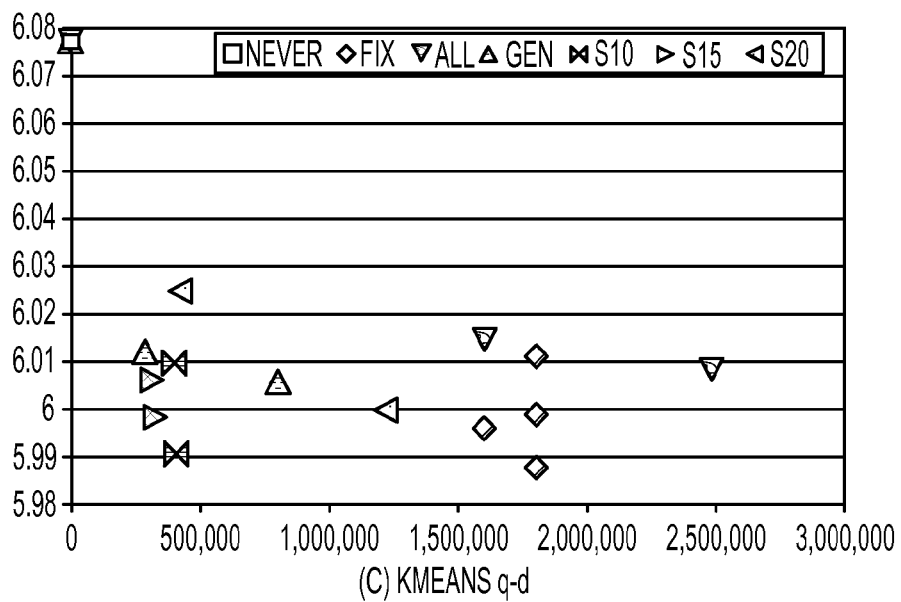
Figure 7D:
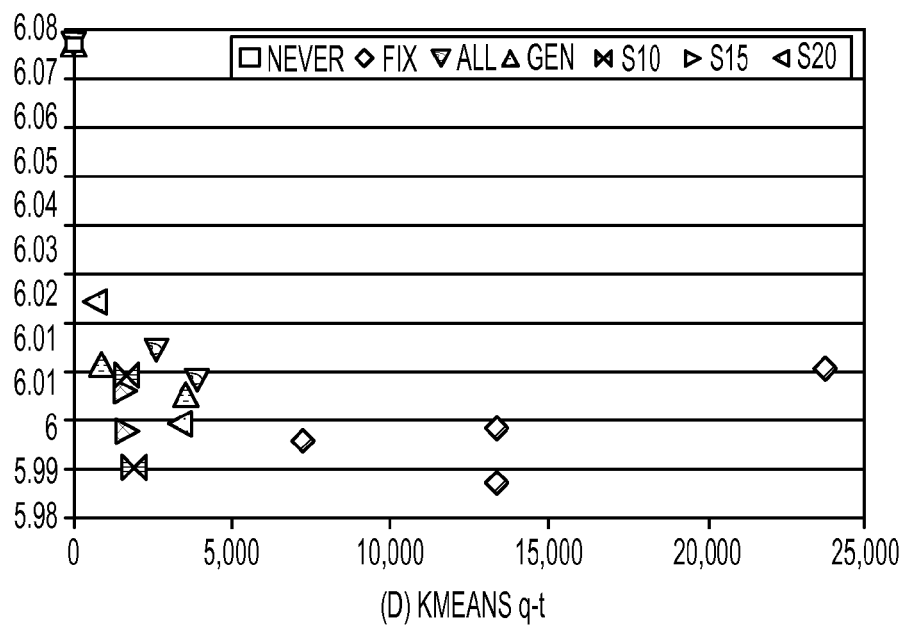
Figure 7E:
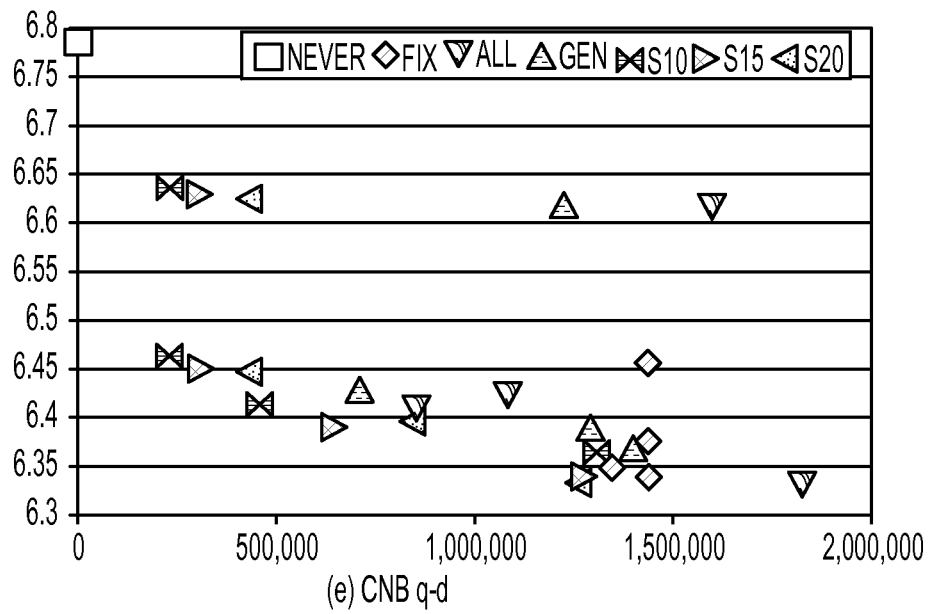
Figure 7F:
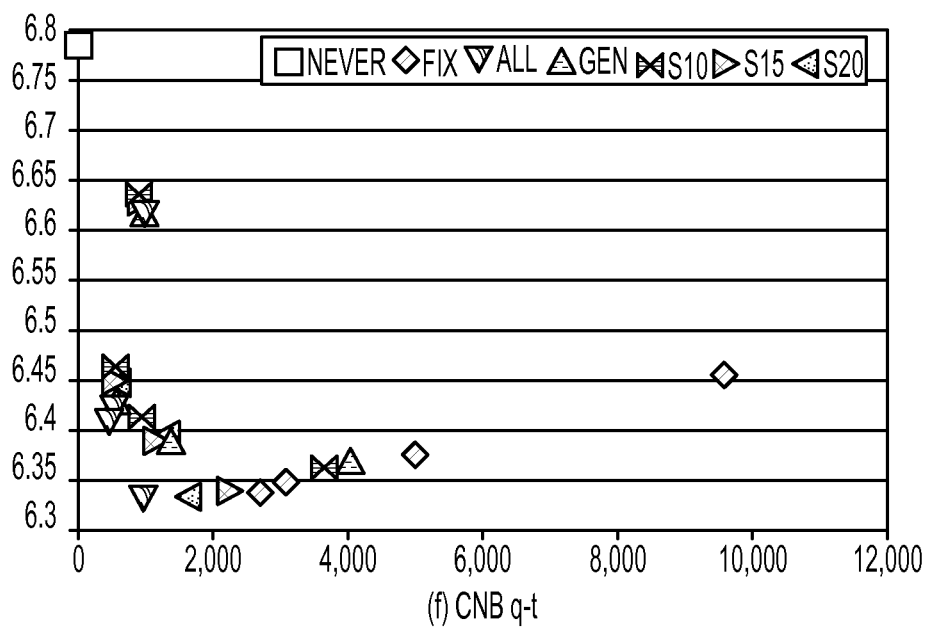

The method of the present disclosure in one embodiment may plot the reciprocal of quality (y axis) against retraining effort (x axis). Quality is measured by the model's accumulative chunk-quality; lower y values indicate better quality. FIGS. 7A, 7C and 7E plot quality vs. training data size, measured in number of training data examples (i.e., q-d plot), FIGS. 7B, 7D and 7F plot quality vs. training time, measured in seconds (i.e., q-t plot); lower x values indicate less retraining effort. The Pareto frontier nearest origin holds optimal tradeoffs (i.e., better quality with less retraining effort). In these experiments, the method of the present disclosure in one embodiment used quality thresholds of 80%, 82.5%, 85%, 87.5%, and 90% for ALSWR, 90%, 95%, 96%, 97%, and 98% for KMeans, and 90%, 92.5%, 94%, and 95% for CNB. A higher quality threshold yields a smaller value for reciprocal of quality (lower y-axis value in these plots).

Figure 8A:
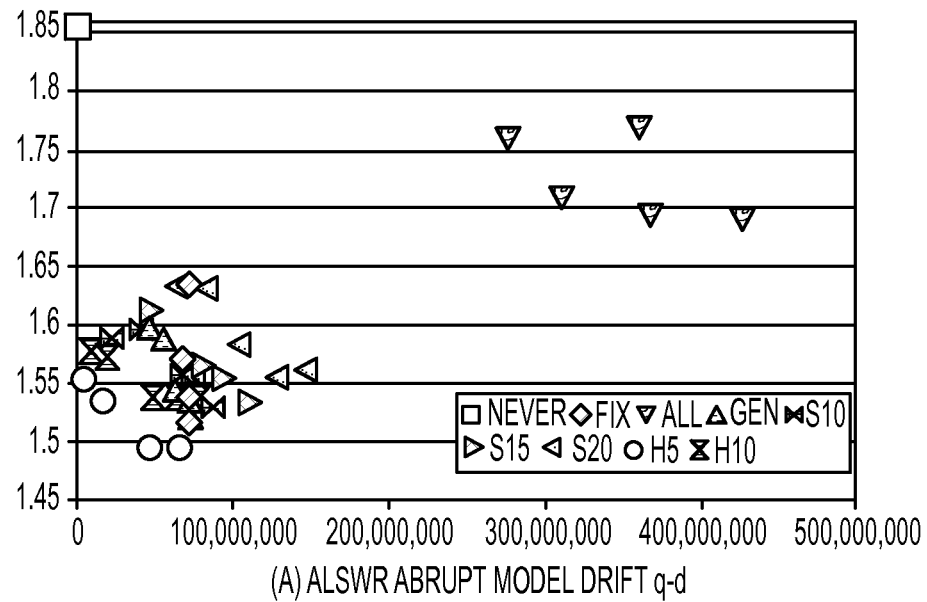
FIGS. 8A and 8B show similar graphical plots to FIGS. 7A-7F (i.e., q-d plot and q-t plot) for a scenario with abrupt model drif in one embodiment of the present disclosure.
Figure 8B:
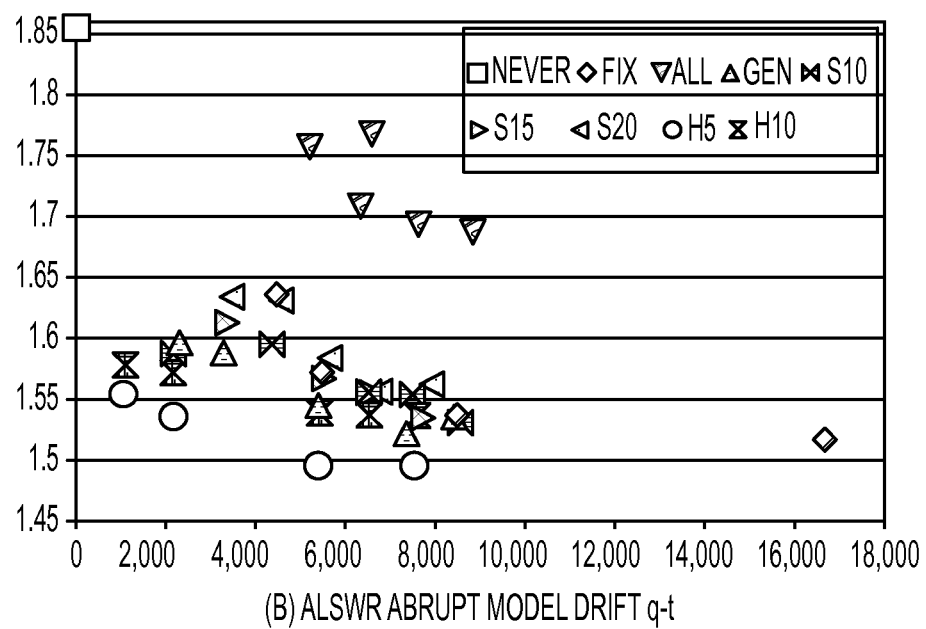

FIGS. 8A and 8B show similar plots to FIGS. 7A-7F (i.e., q-d plot and q-t plot) for scenario with abrupt model drift. H5 and H10 are strategies that detect abrupt model drift, and use hold-data of 5% and 10% of the whole-world data size, respectively.

For the Fix strategy, each data point characterizes the quality-effort tradeoff for a chosen training dataset size, e.g., 10% of the whole-world dataset. For the quality-directed retraining strategies, each data point characterizes the quality-effort tradeoff for a chosen quality threshold, e.g., 80%. The present disclosure may use the same set of quality thresholds (e.g., 80%, 82.5%, 85%, etc.) for each quality-directed retraining strategy.

The lower y, the better quality; the smaller x, the less retraining effort. The Pareto frontier nearest the origin represents an optimal tradeoff (i.e., better quality with less retraining effort). A data point $p_1$ dominates data point $p_2$ in the plot if $p_1$ takes less training effort and yields better model quality than $p_2$.

Quantitatively

TABLE 3

Overall sub-optimal score and in-strategy sub-optimal score for all strategies, summed over all three benchmarks. A lower overall sub-optimal score indicates a better strategy. A lower in-strategy sub-optimal score indicates a more stable strategy. (S10, S15, and S20 are sliding windows of size 10%, 15%, and 20% of the whole-world data set, respectively.)

| Strategy | Training data size | | Training time | |
|---|---|---|---|---|
| | Overall | In-strategy | Overall | In-strategy |
| Fix | 49 | 13 | 73 | 16 |
| All | 74 | 4 | 25 | 5 |
| Gen | 33 | 4 | 39 | 3 |
| S10 | 3 | 0 | 27 | 2 |
| S15 | 6 | 0 | 15 | 2 |
| S20 | 14 | 0 | 22 | 1 |

Table 3 records the sub-optimal score and in-strategy sub-optimal score for all strategies. For each data point p, its sub-optimal score is the number of points that dominate p, and its in-strategy sub-optimal score is the number of points with the same strategy asp that dominate p. The present disclosure generalizes the scores from individual points to strategies by summation.

The sub-optimal score characterizes how well a strategy compares against other strategies, the lower the better. The in-strategy sub-optimal score characterizes a strategy's stability: a lower in-strategy sub-optimal score indicates a more stable strategy, since different parameter settings make different but not strictly better tradeoffs. The present disclosure tallies the scores for all retraining strategies across all benchmarks. The following description summarizes findings in the present disclosure for each algorithm.

ALSWR

Cross-Strategy Comparison

When measuring effort by training data size (FIG. 7A), strategy sliding window 10% yields the best tradeoff and strategy All yields the worst tradeoff, because using the entire dataset hardly improves model quality. When measuring effort by training time (FIG. 7B), strategy sliding window 15% yields the best tradeoff and strategy Fix yields the worst tradeoff, because Hadoop spends a significant amount of time starting each job.

Strategy Stability

Strategies All and sliding-window strategies (S10, S15, S20) are rather stable, Fix and Gen are not stable. Since the cumulative training data set size for strategy Fix is constant, all points have the same x value in FIG. 7A, and there can be only one optimal one. The reason why the Gen strategy is not stable is that when the quality threshold is low, AQuA starts to retrain after it collects an excessively long history; in this case, the model has been at a lower quality for longer, and the training data is outdated. In contrast, when the quality threshold is set just high enough, AQuA retrains with recent data and model quality remains high.

KMeans

Cross-Strategy Comparison

When measuring effort by training data size (FIG. 7C), strategy S10 does best and strategy All does worst. The KMeans model does not drift much, so strategy All carries too much history without benefiting from a better model. When measuring effort by training time (FIG. 7D), strategy S15 does best and strategy Fix does worst, because the model does not drift much and frequent retraining does not improve the quality.

Strategy Stability

Similar to ALSWR's case, strategy Fix is not stable.

CNB

Cross-Strategy Comparison

When measuring effort by training data size (FIG. 7E), strategy sliding window 10% and sliding window 15% do best and strategy all does worst, because to get the same quality, all trains with a larger data set. When measuring effort by training time (FIG. 7F), strategy all does best and strategy fixed-size does worst. Strategy all performs best for two reasons. First, CNB is a simple machine learning algorithm whose computational complexity grows linearly with the data set size. Although strategy all trains with a larger dataset, Hadoop job startup cost can outweigh the computation cost if invoked frequently. Second, there is one data point (i.e., quality threshold 95%, the lowest yellow point in FIG. 7F) that only requires two retrainings compared to the second best strategy (i.e., sliding window 20%) that requires three retrainings. Thus, strategy all invokes Hadoop jobs one third less frequently and takes less time. This one data point happens to dominate many other retraining strategy data points. Strategy fixed-size is the worst for the same reason as in ALSWR and KMeans' cases.

Strategy Stability

The sliding window strategies are the most stable ones.

Summary

In the above experiments, it is found that sliding-window strategies (S10, S15, and S20) consistently offer the best tradeoff between retraining effort and model quality, and they are stable. In addition, the Fix strategy, which is quality-oblivious, consistently performs worse than quality-directed retraining strategies.

Abrupt Model Drift

To test if AQuA can handle abrupt model drift, the present disclosure inverted all the NETFLIX movie ratings (e.g., change 5 to 1, 4 to 2, etc.) starting at the middle of the incoming training data stream. For the change point strategies, the present disclosure experimented with two different hold-data sizes: 5% and 10% of the whole-world data size. When no abrupt model drift was detected, the change point strategies fall back to S15 as the default retraining strategy. FIGS. 8A and 8B show the results graphically, and Table 4 tallies up the overall and in-strategy sub-optimal scores.

Cross-Strategy Comparison

Abrupt model drift detection with sliding-window strategies work the best. Strategy All is the worst, because it always contains conflicting training examples.

Strategy Stability

The Fix and All strategies are less stable than others.

Summary

In this experiment, when there is an abrupt model drift, the sliding-window strategy with abrupt model drift detection is found to work best.

TABLE 4

Overall sub-optimal score and in-strategy sub-optimal score for all retraining strategies when there is an abrupt model drift. A lower overall sub-optimal score indicates a better strategy. A lower in-strategy sub-optimal score indicates a more stable strategy.

| Strategy | Training data size | | Training time | |
|---|---|---|---|---|
| | Overall | In-strategy | Overall | In-strategy |
| Fix | 38 | 4 | 26 | 0 |
| All | 172 | 2 | 116 | 2 |
| Gen | 25 | 0 | 17 | 1 |
| S10 | 33 | 1 | 25 | 1 |
| S15 | 51 | 0 | 28 | 0 |
| S20 | 96 | 1 | 51 | 1 |
| H5 | 1 | 1 | 1 | 1 |
| H10 | 16 | 0 | 11 | 0 |

Does training with all the data yield the highest-quality model?

In all plots in FIGS. 7A-7F, the data point with the lowest y value indicates the best model quality in absolute terms. It can be read from these plots that (1) When there is abrupt model drift, strategy All produces the lowest quality model. (2) For KMeans, strategy All does not generate the best quality model. (3) For CNB and ALSWR, strategy All generates the best quality model, but only marginally: its quality is 0.2% (ALSWR) and 0.03% (CNB) better than the second-best quality model. These findings indicate that retraining with all training data does not always produce the best quality model, and one should not always carry the old training data when designing an incremental training system.

Quality of Incremental Training

To estimate an incremental training system's model quality, the present disclosure evaluates the new model using the test data collected since the previous retraining, at the end of each AQuA retraining phase. This evaluation result is the quality of what a perfect incremental training system would produce at that point (regardless of training cost). The present disclosure then compares this number to the quality when AQuA started retraining, which is the model quality AQuA produces.

It is found that on average, the estimated overall quality of incremental training is at most 13.5% higher for ALSWR, 3.7% higher for CNB, and 1.2% higher for KMeans. This indicates a system like AQuA can significantly reduce training effort with modest impact on model quality, with no additional space cost. A user can easily decide how to balance training effort and model quality by setting the quality threshold for AQuA.

AQuA Tunable Parameters

In one embodiment, AQuA is an adaptive system. For example, in AQuA, users may provide only four parameters to run. The parameters may include quality threshold, inertia window size, sliding window size, and hold-data size. Users, for instance, with experience with the data set and analytics being applied may be able to supply usable values for these parameters. For example, consider when a user migrates a system that was based on fixed-size retraining schedule (corresponding to the Fix strategy) to AQuA. Let N be the size of the original schedule. If the user demands a relatively low quality-threshold, AQuA would rarely trigger a retraining, thus saving a significant amount of training resources while satisfying the user's demand, compared to the old system. If the quality-threshold was set unreasonably high, as a rule of thumb, one can set inertia window size and sliding window size to the original size N; AQuA would then automatically degenerate to the old fixed-size schedule system. If the quality-threshold is set at a reasonable value, then AQuA can guarantee a model of that quality threshold while minimizing the retraining effort. Throughout experiments in the present disclosure, the experiments of the present disclosure may start with a reasonable inertia window size (i.e., the amount of data that can sufficiently train a model to be useful), then experiment with sliding window size of 1×, 1.5×, and 2× the inertia window size. One can set the inertia window size to the original fixed size N.

In one embodiment, hold-data size may be set to the inertia window size (or a fraction of that, e.g., 50%), for example, which may achieve the best tradeoff, for example, because AQuA can suffer less from the conflicting dataset and bring the model to a functional stage faster.

The system, method and/or techniques described herein in one embodiment may maintain a model for a changing data set with high quality and low performance cost. The system, method and techniques of the present disclosure in one embodiment may investigate distributed data with delayed and approximate predictive analytics.

The system, method and/or techniques of the present disclosure in one embodiment apply to big data analytics, and support iterations. Iteration may be needed both in predictive analytics (e.g., transitive closure in a graph) and in descriptive analytics (e.g., repeat until convergence). The system, method and techniques of the present disclosure in one embodiment may measure and/or consider quality in machine learning models. While better performance can indirectly lead to better quality by enabling more frequent retraining, if retrain frequency remains the same, better performance shifts points to the left in FIGS. 7 and 8. A method of the present disclosure may be considered complementary: quality-awareness for Pareto-optimal results. In one aspect, the system, method and/or techniques of the present disclosure in one embodiment take a black-box, systems approach and enable a user to trade quality for performance. In one aspect, the system, method and/or techniques of the present disclosure in one embodiment allow a machine learning algorithm or model or an online learning model to be retrained when model quality falls below a target threshold or abrupt model drift is detected.

In one aspect, a quality-directed adaptive analytic retraining framework (referred to also as AQuA) can work with a large variety of machine learning algorithms and frameworks, for example, and may solve a problem of how to maintain a high-quality big-data analytics model when training data keeps changing.

In this disclosure, evaluation results of AQuA on two large real-world datasets and three widely-used machine learning algorithms are disclosed as examples. The results demonstrate (1) that the quality-directed approach strikes a better balance between model quality and training effort than the traditional quality-oblivious incremental computation system approach and (2) that a near-optimal tradeoff between model quality and training effort is possible in the presence of either gradual or abrupt model drift.

Figure 9:
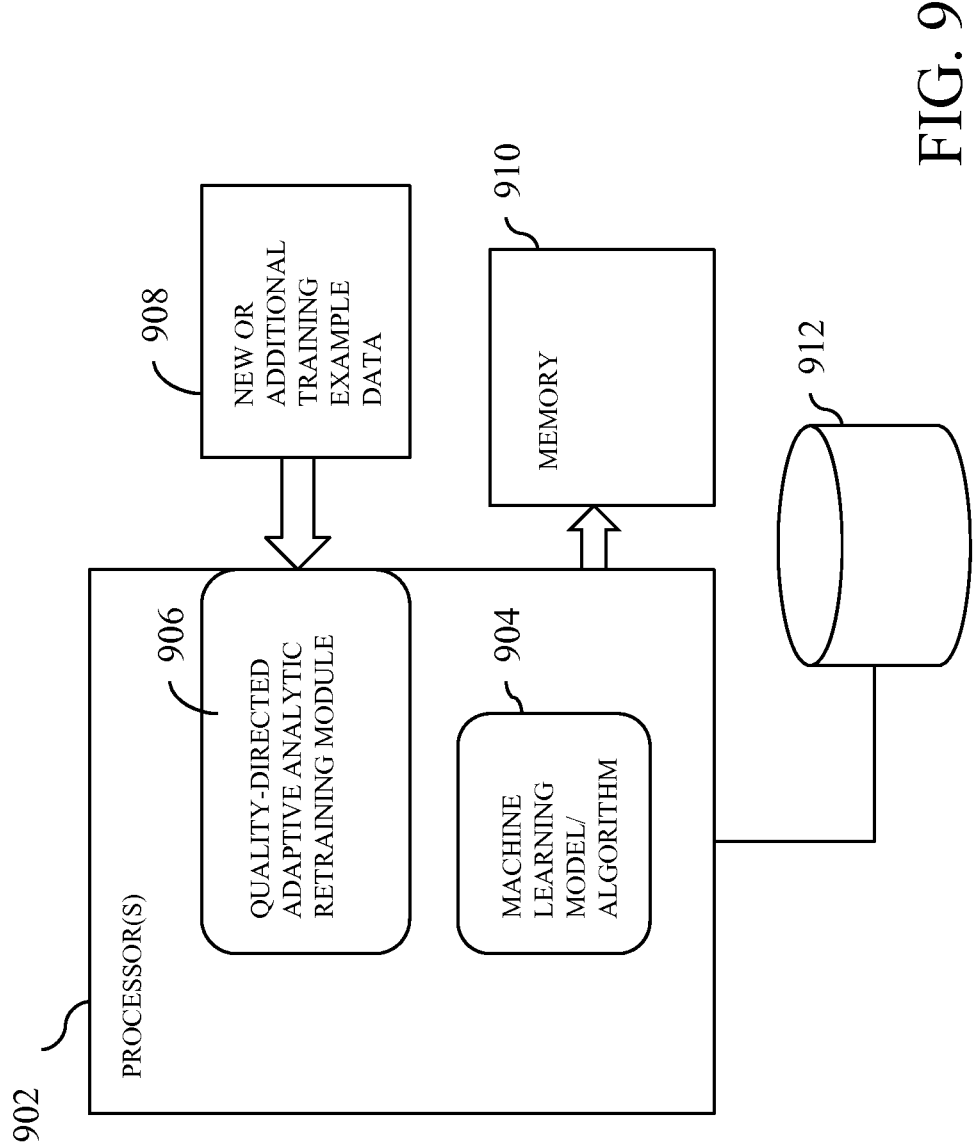
FIG. 9 is a diagram showing example components of a system for quality-directed adaptive analytic retraining in one embodiment of the present disclosure.

FIG. 9 is a diagram showing example components of a system for quality-directed adaptive analytic retraining in one embodiment of the present disclosure, for example, described above. One or more hardware processors 902 comprising for example central processing unit(s) or other processing unit(s) may be operable to receive training example data 108 with which to retrain a machine learning model 904 that has been previously trained. The training example data 908, for example, may be received as a data file that can be read, via a graphical user interface through which a user may enter the data or location of the data, via a computer communication network communication for example from another machine coupled to the processor 902, and/or by another mechanism. For instance, the machine learning model 904 has been trained and for example evaluated based on previously obtained or received training data. One or more hardware processors 902 may be operable to run the machine learning model 904, evaluate it, and/or retrain it. The received training example data 908, for example, represents new or addition training example, delta training data. The incoming training example data 908 is stored in memory 910 coupled to the processor 902. The new training example data 908 may be also stored in a persisten storage device 912. The storage device 912 may store previous training data and one or more machine learning models.

The one or more components of the system shown in FIG. 9 may perform the methods/techniques described above. For instance, one or more of the processors 902, for example, a quality-directed adaptive analytic retraining module 906 executing on one or more processors 902, may evaluate the machine learning model at least by running the machine learning model on a processor with the training example data. One or more of the processors 902 may determine a normalized quality measure based on the evaluating. One or more of the processors 902 may determine whether to retrain the machine learning model at least based on the normalized quality measure, and responsive to determining that the machine learning model is to be retrained, one or more of the processors may retrain the machine learning model. Responsive to determining that the machine learning model does not need to be retrained, the training example data may be accumulated, for example, in a database or storage 912, without retraining the machine learning model 904.

In one embodiment, one or more of the processors 902 may determine whether to retrain the machine learning model at least based on the normalized quality measure, for example, determining whether the quality measure is below a quality threshold, wherein responsive to determining that the quality measure is below the quality threshold, the machine learning model is retrained.

In another embodiment, one or more of the processors 902 may determine whether the quality measure is below a quality threshold, and determine whether a number of available data items comprising at least the training example data meet a specified number of inertia window data items, wherein responsive to determining that the quality measure is below the quality threshold and the number of available data items comprising at least the training example data meets the specified number of inertia window data items, the machine learning model is retrained.

In one embodiment, one or more of the processors 902 may select a retraining data set, e.g., from a database 912, by selecting all available training data comprising initial training data used to train the machine learning model initially if available and the training example data. In another embodiment, one or more of the processors 902 may select a retraining data set, e.g., from a database 912, by selecting training data available since the last retraining of the machine learning model 904. Yet in another embodiment, one or more of the processors 902 may select a retraining data set, e.g., from a database 912, by selecting a sliding window amount of data of the most recent training data. The machine learning model 904 may be retrained with the selected retraining data set.

In one embodiment, one or more of the processors 902 may detect an abrupt model drift in the machine learning model by computing an exponential moving average (EMA) quality using a window of a most recent training data, and comparing the EMA quality with an overall quality measure of the machine learning model. One or more of the processors 902 may determine whether a threshold amount of training data is available since the abrupt model drift (e.g., a change point), and responsive to determining that the threshold amount of training data is available, one or more of the processors 902 may trigger a start of retraining of the machine learning model 904.

Figure 10:
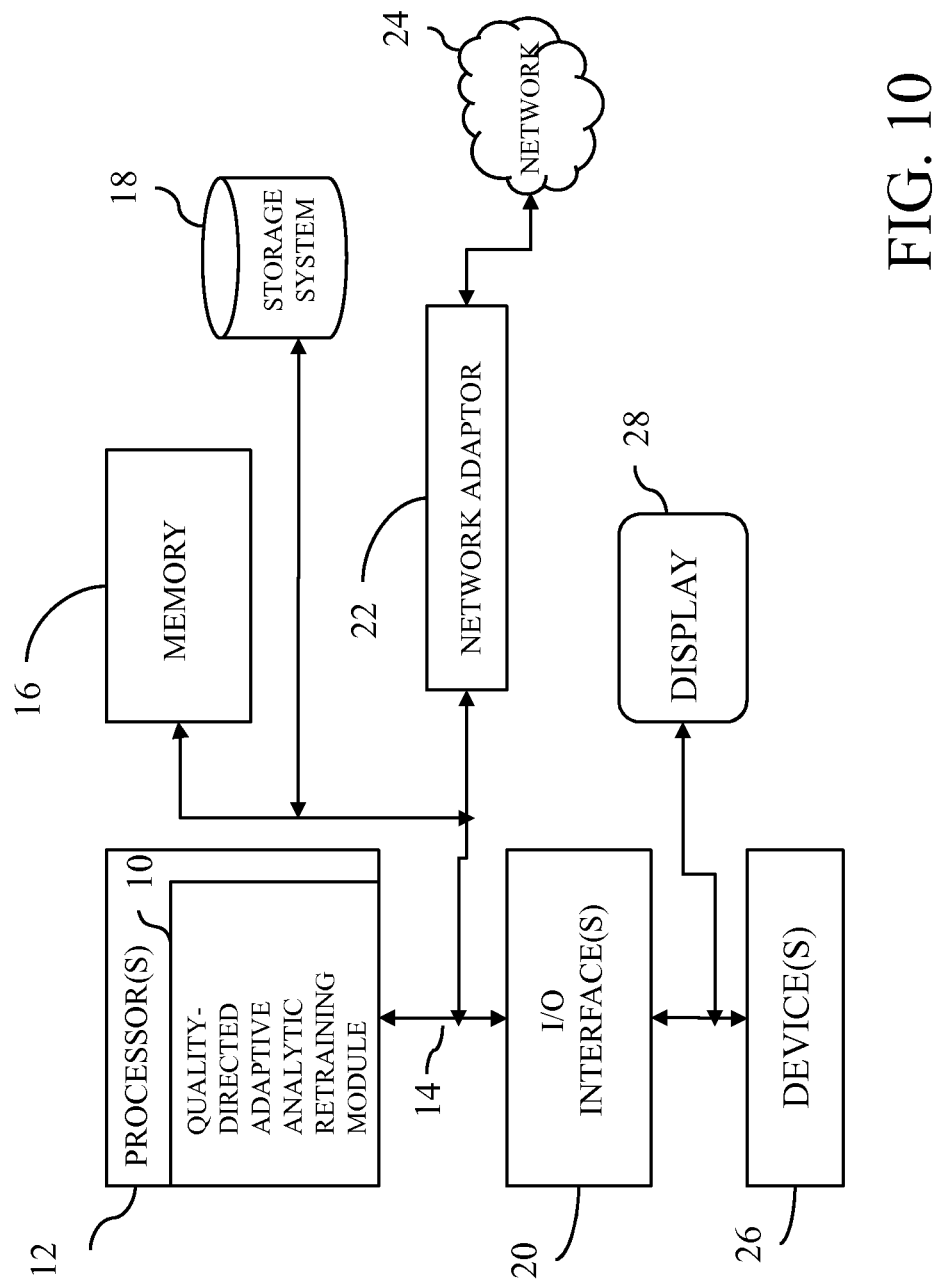
FIG. 10 illustrates a schematic of an example computer or processing system that may implement a quality-directed adaptive analytic retraining system in one embodiment of the present disclosure.

FIG. 10 illustrates a schematic of an example computer or processing system that may implement a quality-directed adaptive analytic retraining system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a quality-directed adaptive analytic retraining module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of quality-directed adaptive analytic retraining, comprising:
   receiving training example data with which to retrain a machine learning model that has been previously trained;
   storing the training example data in a memory;
   evaluating the machine learning model at least by running the machine learning model with the training example data;
   determining a normalized quality measure based on the evaluating;
   determining whether to retrain the machine learning model at least based on the normalized quality measure; and
   responsive to determining that the machine learning model is to be retrained, retraining the machine learning model,
   wherein the machine learning model is not retrained if it is determined that the machine learning model is not to be retrained,
   wherein determining whether to retrain the machine learning model at least based on the normalized quality measure, comprises:
   determining whether the quality measure is below a quality threshold; and
   determining whether a number of available data items comprising at least the training example data meet a specified number of inertia window data items;
   wherein responsive to determining that the quality measure is below the quality threshold and the number of available data items comprising at least the training example data meets the specified number of inertia window data items, the machine learning model is retrained.

2. The method of claim 1, wherein the evaluating comprises performing a prediction by running the machine learning model with the training example data, and updating one or more of a loss function for supervised learning or a cost function for unsupervised learning.

3. The method of claim 1, wherein the method further comprises:
   responsive to determining that the machine learning model is to be retrained, selecting a retraining data set.

4. The method of claim 3, wherein the selecting a retraining data set comprises one or more of:
   selecting all available training data comprising initial training data used to train the machine learning model initially if available and the training example data;
   selecting training data available since a last retraining of the machine learning model; or
   selecting a sliding window amount of data of a most recent training data,
   wherein the machine learning model is retrained with the selected retraining data set.

5. The method of claim 1, further comprising:
   detecting an abrupt model drift in the machine learning model by computing an exponential moving average (EMA) quality using a window of a most recent training data, and comparing the EMA quality with an overall quality measure of the machine learning model.

6. The method of claim 5, further comprising:
   determining whether a threshold amount of training data is available since the abrupt model drift; and
   responsive to determining that the threshold amount of training data is available, triggering a start of retraining of the machine learning model.

7. A computer readable storage medium storing a program of instructions executable by a machine to perform a method of quality-directed adaptive analytic retraining, the method comprising:

receiving training example data with which to retrain a machine learning model that has been previously trained;

storing the training example data in a memory;

evaluating the machine learning model at least by running the machine learning model with the training example data;

determining a normalized quality measure based on the evaluating;

determining whether to retrain the machine learning model at least based on the normalized quality measure; and responsive to determining that the machine learning model is to be retrained, retraining the machine learning model, wherein the machine learning model is not retrained if it is not determined that the machine learning model should be retrained, wherein determining whether to retrain the machine learning model at least based on the normalized quality measure, comprises:

determining whether the quality measure is below a quality threshold; and determining whether a number of available data items for retraining comprising at least the training example data meet a specified number of inertia window data items;

wherein responsive to determining that the quality measure is below the quality threshold and the number of available data items comprising at least the training example data meets the specified number of inertia window data items, the machine learning model is retrained.

8. The computer readable storage medium of claim 7, wherein the evaluating comprises performing a prediction by running the machine learning model with the training example data, and updating one or more of a loss function for supervised learning or a cost function for unsupervised learning.

9. The computer readable storage medium of claim 7, wherein the method further comprises:

responsive to determining that the machine learning model is to be retrained, selecting a retraining data set.

10. The computer readable storage medium of claim 9, wherein the selecting a retraining data set comprises one or more of:

selecting all available training data comprising initial training data used to train the machine learning model initially if available and the training example data;

selecting training data available since a last retraining of the machine learning model; or selecting a sliding window amount of data of a most recent training data, wherein the machine learning model is retrained with the selected retraining data set.

11. The computer readable storage medium of claim 7, further comprising:

detecting an abrupt model drift in the machine learning model by computing an exponential moving average (EMA) quality using a window of a most recent training data, and comparing the EMA quality with an overall quality measure of the machine learning model.

12. The computer readable storage medium of claim 11, further comprising:

determining whether a threshold amount of training data is available since the abrupt model drift; and responsive to determining that the threshold amount of training data is available, triggering a start of retraining of the machine learning model.

13. A system for quality-directed adaptive analytic retraining, comprising:

one or more processors operable to receive training example data with which to retrain a machine learning model that has been previously trained; and a memory device operable to store the training example data;

one or more of the processors further operable to evaluate the machine learning model at least by running the machine learning model on a processor with the training example data, one or more of the processors further operable to determine a normalized quality measure based on the evaluating, one or more of the processors further operable to determine whether to retrain the machine learning model at least based on the normalized quality measure, and responsive to determining that the machine learning model is to be retrained, one or more of the processors further operable to retrain the machine learning model, wherein responsive to determining that the machine learning model does not need to be retrained, the training example data is accumulated without retraining the machine learning model, wherein one or more of the processors determines whether to retrain the machine learning model at least based on the normalized quality measure, by one or more of:

determining whether the quality measure is below a quality threshold, wherein responsive to determining that the quality measure is below the quality threshold, the machine learning model is retrained; or determining whether the quality measure is below a quality threshold, and determining whether a number of available data items comprising at least the training example data meet a specified number of inertia window data items, wherein responsive to determining that the quality measure is below the quality threshold and the number of available data items comprising at least the training example data meet the specified number of inertia window data items, the machine learning model is retrained.

14. The system of claim 13, wherein one or more of the processors is further operable to select a retraining data set by one or more of:

selecting all available training data comprising initial training data used to train the machine learning model initially if available and the training example data;

selecting training data available since a last retraining of the machine learning model; or selecting a sliding window amount of data of a most recent training data, wherein the machine learning model is retrained with the selected retraining data set.

15. The system of claim 13, wherein one or more of the processors is further operable to detect an abrupt model drift in the machine learning model by computing an exponential moving average (EMA) quality using a window of a most recent training data, and comparing the EMA quality with an overall quality measure of the machine learning model, and one or more of the processors further operable to determine whether a threshold amount of training data is available since the abrupt model drift, responsive to determining that the threshold amount of training data is available, one or more of the processors further operable to trigger a start of retraining of the machine learning model.

* * * * *